United States Patent [19]

Hazama et al.

[11] 4,365,881

[45] Dec. 28, 1982

[54] PHOTOGRAPHIC CAMERA WITH TIMEPIECE

[75] Inventors: Kiyoaki Hazama; Kazuo Shiozawa; Koichi Matsumoto, all of Hachioji, Japan

[73] Assignee: Konishiroku Photo Industry Co., Ltd., Tokyo, Japan

[21] Appl. No.: 127,766

[22] Filed: Mar. 6, 1980

Related U.S. Application Data

[63] Continuation-in-part of Ser. No. 47,830, Jun. 12, 1979, abandoned.

[30] Foreign Application Priority Data

Jun. 19, 1978 [JP] Japan .................................. 53-73293

[51] Int. Cl.$^3$ ...................... G03B 29/00; G03B 17/04; G03B 17/24
[52] U.S. Cl. ...................................... 354/76; 354/106; 354/187; 354/289; 368/10

[58] Field of Search .................... 354/76, 75, 105, 106, 354/109, 187, 288–289; 368/10, 278; 355/39, 40

[56] References Cited

U.S. PATENT DOCUMENTS 3,953,868  4/1976  Kawamura et al. ................. 354/109

FOREIGN PATENT DOCUMENTS 2654259  6/1977  Fed. Rep. of Germany ...... 354/105
599841  11/1959  Italy .................................... 354/105

*Primary Examiner*—L. T. Hix
*Assistant Examiner*—Thomas H. Tarcza
*Attorney, Agent, or Firm*—Linda G. Bierman; Jordan B. Bierman

[57] ABSTRACT

A photographic camera having an integral timepiece includes a case adjustable between an open condition for use as a camera capable of recording data and a collapsed condition in which the camera elements are concealed from view and only an external time display is visible.

7 Claims, 5 Drawing Figures

PHOTOGRAPHIC CAMERA WITH TIMEPIECE

BACKGROUND OF THE INVENTION

This application is a continuation-in-part of application Ser. No. 47,830, filed June 12, 1979, now abandoned.

1. Field of the Invention

The present invention relates to a photographic camera which may also serve as a table clock.

2. Description of the Prior Art

Heretofore, there has been known a photographic camera which can be folded or collapsed in a boxlike configuration with a photographic lens system accommodated there-in, a photographic camera having a built-in electronic timepiece for displaying the time externally in very small area, and a photographic camera which is capable of photographically recording the time data given by a timepiece or conditions such as shutter speed and F-stop values, respectively.

SUMMARY OF THE INVENTION

A primary object of the invention is to provide a photographic camera usable as a table clock in a state in which substantially no components of the camera can be visually observed, when the camera is not used for taking pictures.

A further object of the invention is to provide a photographic camera with a built-in timepiece which comprises a housing adapted to be collapsed into a box-like configuration and having a data displaying portion on the external surface thereof for displaying time data obtained from a built-in electronic timepiece device, whereby the camera is adapted for use as a clock in the collapsed state in which substantially no components of the camera can be visually observed.

Another object of the invention is to provide a photographic camera having a built-in timepiece and which is capable of recording information obtained by utilizing an output of the data signal of the electronic timepiece on the film to be used, wherein upon opening the collapsed or folded camera the time displayed by the data displaying means is changed to data (such as the date or a photographic condition) to be recorded on the film to further function as a monitor.

DETAILED DESCRIPTION OF THE PREFERRED EMBODIMENTS

Figure 1:
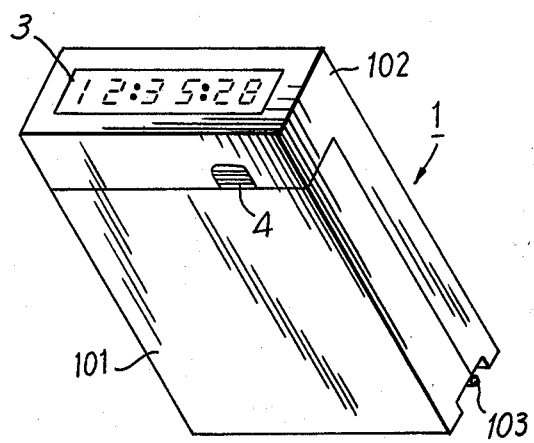
FIGS. 1 and 2 are perspective views showing a photographic camera according to the present invention in its collapsed (the first condition) and unfolded (the second condition) states, respectively.
Figure 2:
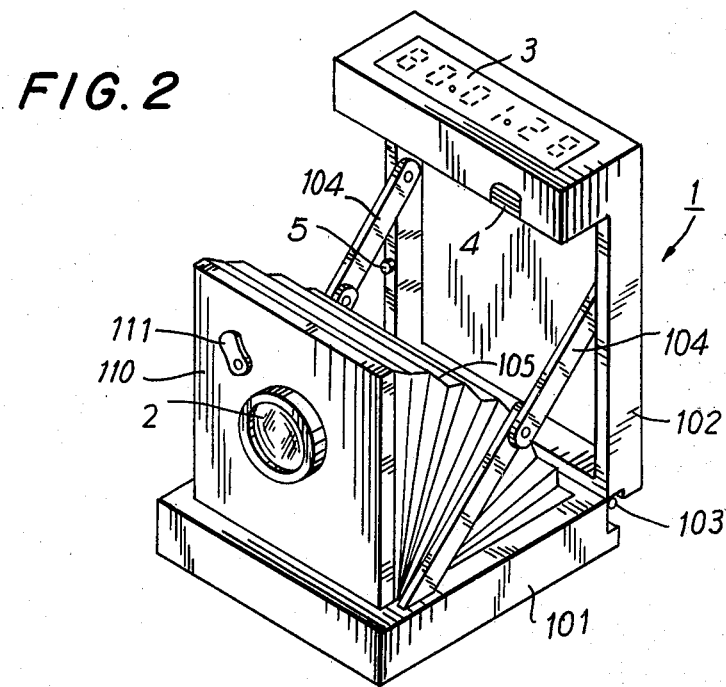

Referring to FIGS. 1 and 2, a photographic camera 1 comprises at least two bodies 101 and 102 connected together at a hinge 103 and link supporting means 104 so that the body 102 is relatively movable between open and shut positions with respect to the body 101, the body 102 being in the nature of a cover and being hereinafter so identified. Put another way, the cover 102 is movable between the second and first conditions or positions. An objective lens 2 is mounted to the body 101 for up and down movement through a bellows 105 on a supporting plate 110. Also carried on the supporting plate 110 is a shutter releasing means 111. The objective lens, the bellows, the shutter releasing means, and the supporting plate are disposed in a depression (not shown) formed in the body 101 when the cover is shut as shown in FIG. 1. Accordingly, these elements are completely covered and concealed by the cover 102 in the FIG. 1 or first position. Thus, the photographic camera 1 is adapted to be folded or collapsed into a box-like configuration.

On the external surface of the cover 102 is a data displaying portion at which a data displaying means 3 is disposed. The means 3 may comprise a photoelectric converter such as a liquid crystal displaying element (hereinafter referred to as an LCD) or a light-emitting element array and is arranged to be externally observable in the collapsed state of the camera for displaying the current or instant time. In FIG. 1, the means 3 is shown displaying a time of 12 hours, 35 minutes, and 28 seconds.

When a latch release button 4 is pressed, the camera is released from its folded or collapsed state whereby the cover 102 opens to the second condition in the manner illustrated in FIG. 2 for use as a photographic camera. As will be appreciated from the above description, appropriate locking means or engaging means is provided on the body 101 and cover 102 for maintaining the camera in its collapsed state.

On opening of the cover 102 with respect to the body 101, the objective lens is upwardly moved and a selecting means such as the change-over switch 5 (which has been disposed in the depression of the body 101) is outwardly projected; the time displayed by the data displaying means 3 at the displaying portion is thereby replaced by other data, such as dating information or the like, to be photographically automatically recorded. In FIG. 2, display data representing the date Jan. 28, 1980 is seen at the means 3. Thus, the data displaying means 3 displays at least two kinds of data. Alternatively, the change-over switch 5 can be arranged for manual operation after the cover 102 is moved to the second position.

The camera 1 is provided with an additional light-emitting element (hereinafter referred to as an LED) and a cooperating lens means, as necessary, for projecting data onto the film. The method or arrangement itself is well known and is disclosed, for example, in U.S. Pat. No. 3,953,868 or DT-OS No. 2,654,259. In other words, a member corresponding to the LED is shown as reference no. 17 in FIG. 2 of the drawing of U.S. Pat. No. 3,953,868, although a cooperating lens means does not there appear. In the present specification, the data displaying element 3 provided at the data displaying portion of the cover 102 is referred to as an LCD, while an element positioned for the recording of data on the film is referred to as an LED to avoid confusion between the two.

Figure 3:
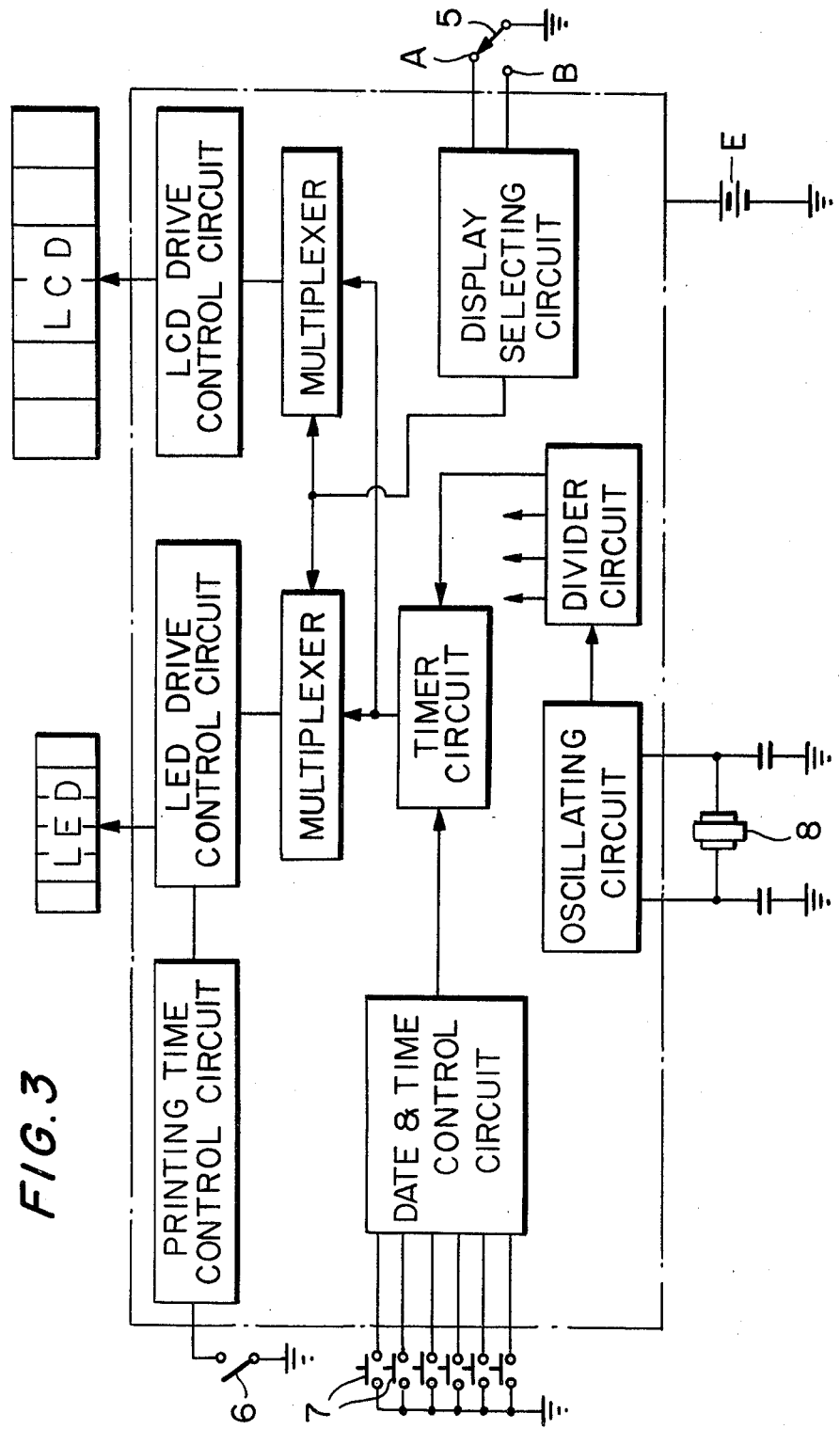
FIG. 3 is a block diagram showing an exemplary embodiment of a driver circuit for a data recording device and a time display device for a photographic camera arranged, in accordance with the invention, to be capable of photographically recording real time data when the camera is in the unfolded or second condition.

The switching operation will next be described with reference to FIG. 3 which shows a driver circuit capable of generating time and other data signals. The inwardly retracted position of the change-over switch 5 (in the folded state of the camera shown in FIG. 1) corresponds to a condition in which the switch 5 is connected to a contact A. In this condition, a display selecting circuit will operate to select a time data signal from time measurement data signals which are supplied to multiplexers from a timer circuit, while the time data signal is supplied to a drive control circuit for displaying the time and to a drive control circuit for the light-emitting element array or LED for recording the data from the respective multiplexers. In the case of the illustrated embodiment, the time displaying means is constituted by an LCD, while the data recording light-emitting element array is constituted by an LED which may be of the 7-segment type having 6 individual positions or figures. By reason of the functioning of the selecting circuit described above, the LCD is capable of displaying time, as shown in FIG. 1. On the other hand, the LED is not energized with the switch 5 connected to contact A, since a recording switch 6 is opened such that no driving signal is supplied to the LED drive control circuit from a printing time control circuit.

The outwardly projecting state of the change-over switch 5 effected by the opening of the cover 102 to the state shown in FIG. 2 corresponds to the state of the switch 5 being connected to a contact B. In this condition, the display selecting circuit operates to select other data such as dating signals from the time measurement signals supplied from the timer circuit to the associated multiplexer, as a result of which the selected signal is supplied to the drive control circuits for the LCD and LED, respectively. Thus, the LCD now displays the dating data to be recorded, as shown in FIG. 2. In this state, actuation of the shutter release button 111 will cause the interlocked recording switch 6 to be closed, whereby the drive starting signal is fed to the LED drive control circuit through the printing time control circuit. Thus, the dating data to be photographically recorded or printed is supplied to the LED which is then energized for a predetermined time duration to emit light for recording the dating or measured time data. Correction or initial setting of the measured time data (including setting of the displayed time) can be effected through a set of correcting switches 7 each corresponding to a date position of the figures of the displaying elements such as the LCD and LED.

More specifically, all of the correcting switches 7 are at first turned on or energized. In the course of displaying data varying from time to time at the individual figure or digit positions, the correcting switch 7 is turned off or deenergized when the correct data to be recorded is displayed at the associated positions of the figures of the display LED. It should be noted that the circuit portion shown in FIG. 3 as enclosed by a phantom line may be implemented in the form of an integrated circuit. Reference symbol E denotes a battery cell for the integrated circuit and reference numeral 8 designates a crystal oscillator element.

For situations wherein data to be recorded is data concerning the photographing conditions, arrangement may be made such that the display selecting circuit operates to select such data representative of the photographic conditions in lieu of the time data signal, both of which are supplied to the multiplexers on the time sharing base. Alternatively, a transmission circuit for the time data may be changed to be a transmission circuit for the data signal representing the photographing conditions. These circuit arrangements may be readily accomplished by those skilled in the art by employing conventional circuit means.

As will be appreciated from the foregoing description, the LCD data displaying means of the photographic camera including a timepiece according to the invention also serves to monitor data to be photographically recorded or printed. Thus, inadvertent recording of incorrect data can be positively prevented since all data to be recorded is displayed for visual verification at the data displaying means. Furthermore, for inspection of the efficiency of the camera and adjustment (including the relative position of the displaying element) during the manufacturing process, the use of a magnifying glass or loupe can be advantageously spared since the data displaying portion or means can be fabricated with large characters. It should be evident that in the photographic camera adapted to record the data described above, the change-over switch for recording the particular data can be connected in series with the switch actuated in response to the shutter release operation, whereby data recording is permitted only when such recording is desired.

Figure 4:
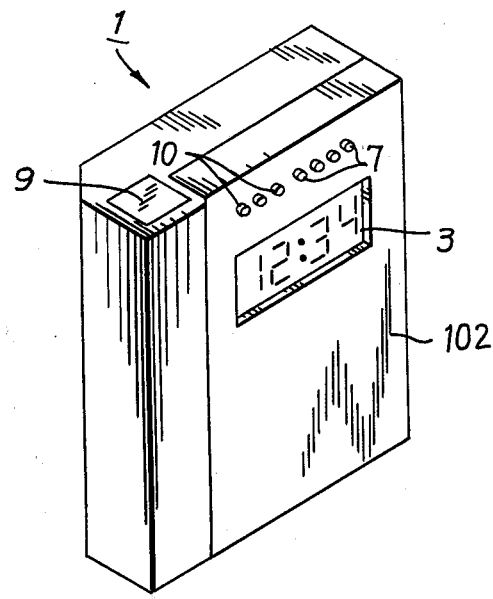
FIGS. 4 and 5 are perspective views showing another embodiment of a photographic camera in accordance with the invention in its folded (the first condition) and unfolded (the second condition) states, respectively.
Figure 5:
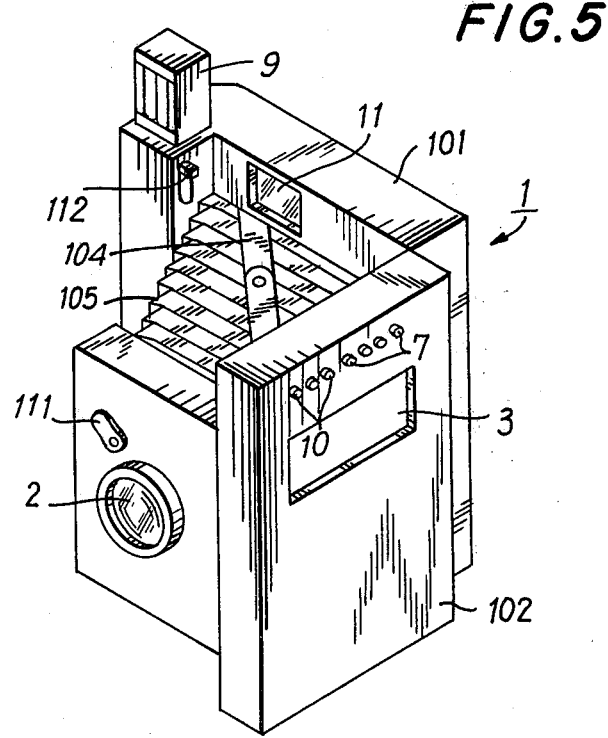

FIGS. 4 and 5 show another embodiment of a photographic camera 1 having an electronic flash unit 9 adapted to be projected from and retracted into the body 101 by member 112. Of course, the camera can be collapsed to a box-like configuration by pressing the front cover 102 to a closed state much the same as with the camera shown in FIGS. 1 and 2. In the Figures, the same reference numerals are used to denote the same elements.

In addition to the time data correcting switches 7, there are further provided the recording data change-over switches 10. Thus, by way of example, when the right-hand one of the switches 10 (as viewed in the drawing) is pressed, the month and day data is recorded; when the intermediate or middle switch 10 is pressed the day and time data can be photographically recorded; and when the left-hand switch 10 is actuated, data representing the photographing conditions is recorded onto the film. On the other hand, when all of the switches are left unactuated, no data recording takes place. In each of the disclosed embodiments, when the cover 102 is opened, the data displaying means 3 will display the data to be photographically recorded. When no data recording is to take place, the display may continue to display the real time. In this manner, the user can verify whether data recording is being effected as well as the particular data to be recorded with the aid of the displaying means.

Reference symbol 11 denotes a viewfinder. The viewfinder 11 may be arranged so as to be capable of projecting from and retracting into the camera body; the same applies as well to the electronic flash unit 9. A hinge connecting the cover 102 and the body 101 is not shown in FIGS. 4 and 5, but such hinge enables the described opening and closing relative movements of the invention camera.

In the foregoing, the invention has been described in conjunction with the preferred embodiments illustrated in the drawings. However it will be appreciated that the invention is not intended to be restricted to these embodiments; many variations and modifications can be readily made by those skilled in the art without departing from the spirit and scope of the invention. For example, an objective lens may be fixedly mounted on the camera body in place of the bellows-type lens assembly. In that case it is also intended that the various elements such as the shutter releasing button, electronic flash unit, and the like are to be concealable on closure of the camera. Furthermore, a range finder system may be implemented to be collapsable in the manner of the electronic flash lamp.

Although a film winding means is neither shown nor described, such means need not project from the outline of the camera body and for this purpose a motor drive, as is well known in the art, may be utilized. Thus, only the time displaying means is observable—other than the box-like outline of the bodies 101 and 102—when the camera is in its collapsable or folded state.

Moreover, the light-emitting element array for recording data may be constituted by an LCD, while the time displaying means may be composed of an LED, and the light-emitting means for recording may be arranged to constantly display the date or to alternatively emit light only in response to the unfolding operation of the camera. An external A.C. power supply may also be utilized in lieu of the voltage source battery cell.

What is claimed is:

1. In a camera having a shutter release means and a built-in electronic timepiece,
    a camera housing comprising a body and a cover hingedly connected with each other so that the cover is movable between a first position in which the camera housing is collapsed to a box-like configuration and a second position in which the housing is open for taking photographs,
    a data displaying portion disposed on an external surface of the camera housing,
    an objective lens on the housing and disposed for the taking of photographs when the cover is in said second position, said lens being concealed within the camera housing in said first position of the cover,
    data displaying means positioned at the data displaying portion of the housing,
    a driver circuit for generating time and other data signals and having an output connected to the data displaying means, and
    means for selecting the data signals appearing at the output of the driver circuit and fed for display to the data displaying means, the time data being displayed by the data displaying means while the housing is collapsed so that the camera is useful as a table clock and is function as a camera is concealed in said collapsed condition of the housing.

2. In a camera according to claim 1, and having a film plane at which film is positioned for photographic exposure,
    a second data displaying means located in opposition to the film plane, the second data displaying means displaying data corresponding to the data displayed at the data displaying portion of the housing for recording the displayed data onto the film during photographic exposure thereof.

3. In a camera according to claim 2, a recording switch operated by the shutter release means for enabling data display at said second displaying means when the shutter release means is operated for photographic exposure of the film.

4. In a camera according to claim 2, said selecting means being adapted to change the data displayed at the data displaying portion of the housing from said time data to said other data when the cover is moved from the first position to the second position.

5. In a camera according to claim 2, data correcting means connected to the driver circuit and operable for selectively altering the data appearing at its output.

6. In a camera according to claim 4, said other data being dating data.

7. In a camera according to claim 4, said other data being data indicative of a photographic condition.

* * * * *